US009512266B2

(12) United States Patent
Wiss et al.

(10) Patent No.: US 9,512,266 B2
(45) Date of Patent: *Dec. 6, 2016

(54) PROCESS FOR ORGANOCATALYTIC RING-OPENING POLYMERIZATION

(71) Applicant: BASF SE, Ludwigshafen (DE)

(72) Inventors: Kerstin Wiss, Mannheim (DE); Sirus Zarbakhsh, Hong Kong Pok Fu Lam (CN); Achim Loeffler, Speyer (DE); Peter Deglmann, Mannheim (DE); Lothar Riebel, Frankenthal (DE); Michael Limbach, Worms (DE); Ronald Lindner, Dossenheim (DE); Michael Ludwik Lejkowski, Mannheim (DE); Julia Frauke Grosse-Willerich, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,618

(22) Filed: Jan. 15, 2015

(65) Prior Publication Data

US 2015/0197599 A1    Jul. 16, 2015

Related U.S. Application Data

(63) Continuation of application No. 13/850,594, filed on Mar. 26, 2013, now Pat. No. 9,056,945.

(60) Provisional application No. 61/615,384, filed on Mar. 26, 2012.

(51) Int. Cl.
| C08G 63/00 | (2006.01) |
| C08G 63/685 | (2006.01) |
| C08G 63/82 | (2006.01) |
| C08G 65/02 | (2006.01) |
| C08G 18/28 | (2006.01) |
| C08G 18/48 | (2006.01) |
| C08G 18/32 | (2006.01) |
| C08G 65/26 | (2006.01) |
| C08G 77/08 | (2006.01) |

(52) U.S. Cl.
CPC ............. *C08G 63/685* (2013.01); *C08G 18/28* (2013.01); *C08G 18/3206* (2013.01); *C08G 18/48* (2013.01); *C08G 18/4837* (2013.01); *C08G 63/823* (2013.01); *C08G 65/02* (2013.01); *C08G 65/2672* (2013.01); *C08G 77/08* (2013.01)

(58) Field of Classification Search
CPC .............................. C07C 41/03; C07C 41/11
USPC ......... 528/405, 408; 564/565; 568/623, 624, 568/620, 679
See application file for complete search history.

(56) References Cited

U.S. PATENT DOCUMENTS

2010/0029961 A1    2/2010  Triller et al.
2010/0261870 A1    10/2010 Loeffler et al.

FOREIGN PATENT DOCUMENTS

WO    WO 2008/152003 A1    12/2008
WO    WO 2009/013344 A1    1/2009
WO    WO 2011/141492 A1    11/2011

*Primary Examiner* — Shane Fang
(74) *Attorney, Agent, or Firm* — Oblon, McClelland, Maier & Neustadt, L.L.P.

(57) ABSTRACT

The present invention relates to a process for organocatalytic ring-opening polymerization of at least one monomer M suitable for ring-opening polymerization, or of mixtures thereof, wherein, in a step (i), at least one N-heterocyclic compound is subjected in the presence of at least one Zerevitinov-active compound Z1 to a temperature of at least 80° C. for a period of at least 30 seconds and, in a step (ii), the monomer M is added and reacted.

22 Claims, 1 Drawing Sheet

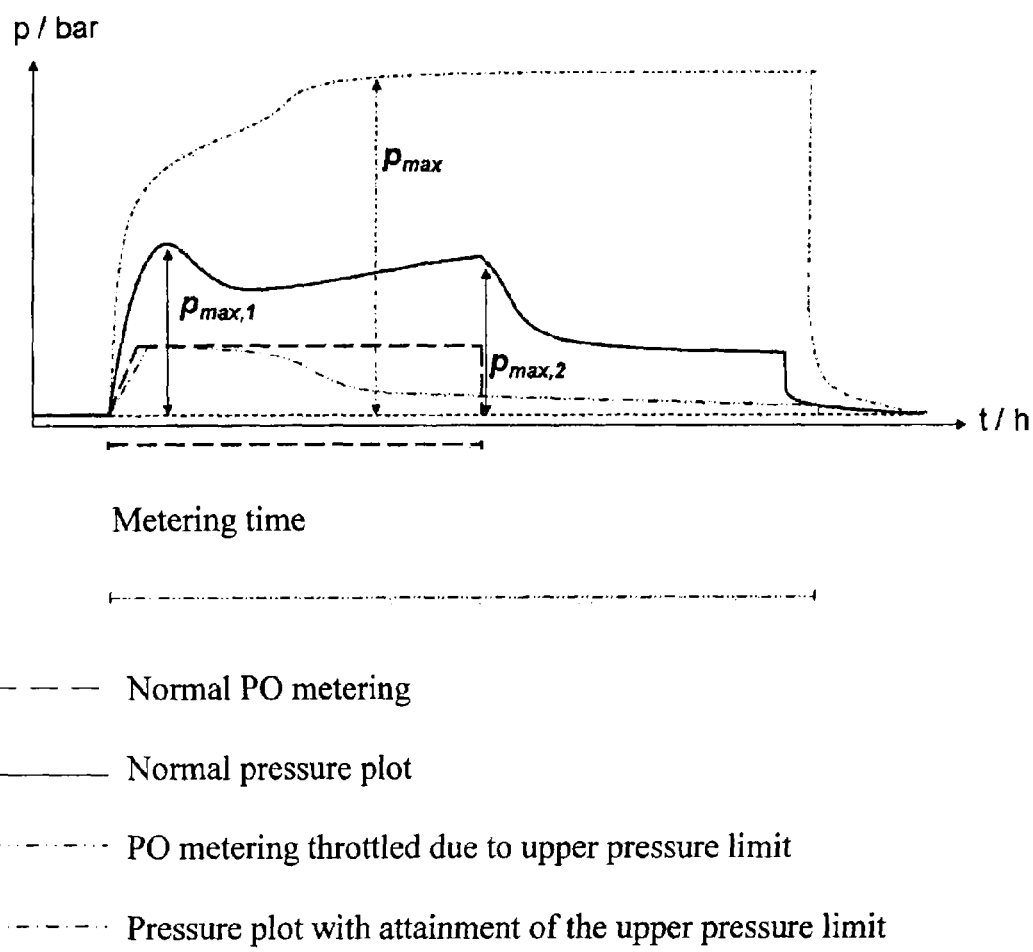

PROCESS FOR ORGANOCATALYTIC RING-OPENING POLYMERIZATION

This application is a continuation application of U.S. application Ser. No. 13/850,594 filed Mar. 26, 2013, now U.S. Pat. No. 9,056,945, and claims priority to U.S. Provisional Patent Application No. 61/615,384, filed on Mar. 26, 2012, each of which is incorporated herein by reference.

DESCRIPTION

The present invention relates to a process for organocatalytic ring-opening polymerization.

N-Heterocyclic carbenes (NHCs) have been known for some years as initiators or organocatalysts for ring-opening polymerization (Dove et al., Polymer 47 (2006), 4018). Application to the catalytic polymerization of ethylene oxide (EO) was first described in 2006 (ACS Polymer Preprints, 47 (2006), 99). Recently, Raynaud et al. (JACS, 131 (2009), 3201; WO2009/013344 in cooperation with Rhodia) also described the stoichiometric ring opening of ethylene oxide (EO) in solution, which forms zwitterionic PEG (polyethylene glycol) oligomers after long reaction times. The patent claims all industrially relevant alkylene oxides as monomers and all standard carbene structures as catalysts, but examples are given only for EO (and thus possible advantages of the NHC catalysts for propylene oxide (PO) are not mentioned). Finally, the same research group in 2010 also published a paper regarding PO polymerization with monofunctional starters under similar reaction conditions (Chem. Commun., 46 (2010), 3203), but no advantages are evident apart from the freedom of the reaction from metal. None of these studies claim use for the preparation of polyurethane (PU) or describe it as particularly advantageous.

Patent application WO 2011/141492 describes the linear ring-opening polymerization of alkylene oxides with NHC catalysts for preparation of polyether- and polyesterols proceeding from difunctional and higher-functionality starters. The advantages mentioned for this invention are particularly the high degrees of polymerization with PO (>5 PO per OH group of the starter, in contrast to conventional organocatalysts) and the possibility of EO end-capping of PPG (polypropylene glycol) cores. Conventional catalysts either lead to a considerable level of monofunctional by-products (KOH catalysis) or do not allow a well-defined end cap on the majority of the secondary hydroxyl groups (in the case of double metal cyanide (DMC) catalysis).

Typical organocatalytic processes with NHCs are based on the nucleophilicity or basicity thereof. However, precisely these properties constitute a crucial barrier to the industrial use of NHCs: free NHCs are typically hydrolysis- and oxidation-sensitive (J. Organomet. Chem., 617 (2001), 242). One option in the process is therefore to release the active NHC species from precatalysts in situ.

A possible solution for this purpose is, for example, that of adducts of the NHCs with, for example, alcohols, chloroform, $CS_2$, $CO_2$. However, the use of the NHC adducts is problematic here due to the high synthetic complexity necessary for preparation of these adducts.

A further possibility is the deprotonation of dialkylimidazolium salts (or imidazolinium, thiazolium, . . . ), which can be shown schematically as follows:

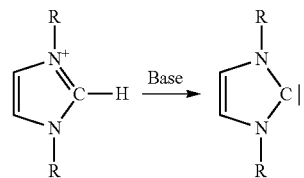

In order to accomplish this deprotonation, quite strong bases are again needed according to the prior art, for example particularly strong organic bases such as phosphazenes (expensive) or alkali metal tert-butoxides (no freedom from metal). The use of such (metal salt) bases necessitates workup of the product.

It is also known that the abovementioned dialkylimidazolium salts, in the event of thermal stress, release basic or nucleophilic intermediates, which is why they are of interest as latent initiators for epoxide hardening: for imidazolium iodides, it was stated as early as 1983 (J. Polym. Sci.: Polym. Lett., 21 (1983), 633) that hardening of epoxy systems based on DEGBA (diglycidyl ether of bisphenol A) can be initiated at 200° C. It is assumed that an intermediate uncharged (alkyl)imidazole, i.e. a widespread class of hardeners in epoxide hardening, is formed. A BASF patent application from 2008 (WO 2008/152003A1) claims a similar catalytic effect in latent epoxide hardening for the analogous imidazolium acetates. However, the hardening of epoxy resins differs from linear ring-opening polymerization in that the epoxide monomers are difunctional or higher-functionality, and crosslinked products accordingly form, whereas the aim in linear ring-opening polymerization is unbranched chains, possibly on higher-functionality starters, and the products are thus still discrete molecules (and mixtures thereof) defined, for example, by molecular weight (distribution) and OH number. In the hardened, crosslinked epoxy resin systems, the complete reaction of all epoxide groups is additionally of minor importance, whereas the aim in the case of linear ring-opening polymerization, however, is maximum conversion of the monofunctional monomers. Furthermore, the most common epoxy compounds in epoxy resin systems (for example DGEBA and other glycidyl ethers, as described in WO20081152003A1) differ from the conventional alkylene oxides, ethylene oxide, propylene oxide and butylene oxide, for linear alkoxylation reactions by the substituents on the epoxide functionality in terms of steric demands and polarity, which leads to the expectation of a strong influence on the reactivity of the monomers and propagating species. Accordingly, it cannot be assumed that the catalysts suitable for epoxy hardening will generally likewise be suitable for efficient linear ring-opening polymerizations.

As expected, in-house experiments with N-alkylimidazoles as organocatalysts for the propoxylation of alcohol starters also showed that the reactivity of these catalysts is not very suitable in practice for preparation of higher molecular weight products (OH number below 150 mg KOH/g) by means of linear ring-opening polymerization, since the low catalytic activity of the alkylimidazole species in the OH number range below 150 mg KOH/g leads to very long cycle times.

It was therefore an object of the present invention to provide a process for alkoxylation or generally for preferably linear organocatalytic ring-opening polymerization, which makes it possible to access the abovementioned range of higher molecular weight products, and which is not afflicted with the abovementioned disadvantage of the necessity of strongly basic or metal-containing reactants. This means that the process, more particularly, should not require use of strong bases, for example metal salt bases.

This object is surprisingly achieved by the process defined in the claims.

It has namely been found that, surprisingly, particular representatives of the abovementioned dialkylimidazolium salts can be used as a precursor without any need to use a strong base; the complex workup of the product is thus dispensed with.

This invention thus provides a process for organocatalytic ring-opening polymerization, preferably for linear organocatalytic ring-opening polymerization, of at least one monomer M suitable for ring-opening polymerization, or of mixtures thereof, wherein, in a step (i), at least one N-heterocyclic compound of the formula (I)

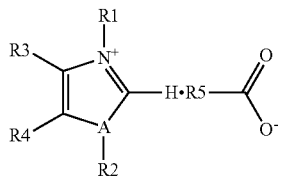

where A is selected from the group consisting of N, O and S, preferably N—where no R2 radical is present when A is O or S—and where R1 and R2 are each independently selected from alkyl and aryl, and where R3, R4 and R5 are each independently selected from H, alkyl, aryl, and where ring closures between R1 and R3, R3 and R4, and R4 and R2 are also possible, is subjected in the presence of at least one Zerevitinov-active compound Z1 to a temperature of at least 80° C., preferably at least 100° C., for a period of at least 30 seconds, preferably at least 5 minutes, and, in a step (ii), the monomer M is added and reacted, preferably in the presence of a Zerevitinov-active compound Z2.

In the context of this invention, "polymerization" means especially the reaction of at least three repeat units; however, shorter oligomers are also included.

A "Zerevitinov-active compound" relates to compounds which are acidic enough to protonate standard Grignard compounds to give the hydrocarbon. Examples of "Zerevitinov-active compounds are alcohols and amines.

A multitude of compounds with the formula (I) is commercially available, for example the ionic liquids Basionics™ from BASF SE.

In one embodiment of the process according to the invention, R1 and R2 are each primary alkyl groups.

In another embodiment of the process according to the invention, R1 is a primary and R2 a secondary alkyl group.

In another embodiment of the process according to the invention, R1 and R2 are each secondary alkyl groups.

In one embodiment of the process according to the invention, the anion in the formula (I) is selected from the group comprising formate, acetate and propionate.

In a further embodiment of the process according to the invention, the anion in the formula (I) is selected from the group comprising benzoate, phthalate, terephthalate and isophthalate.

In a further embodiment of the process according to the invention, the anion in the formula (I) is selected from the group comprising salts of aliphatic dicarboxylic acids, for example succinate or glutarate.

In one embodiment of the process according to the invention, step (ii) is not conducted until after the end of step (i).

In one embodiment of the process according to the invention, step (ii) already commences during the duration of step (i).

In one embodiment of the process according to the invention, at least one Zerevitinov-active compound Z1 is selected from the group consisting of alcohols.

In a further embodiment of the process according to the invention, at least one Zerevitinov-active compound Z1 is selected from the group consisting of amines.

In a further embodiment of the process according to the invention, at least two Zerevitinov-active compounds Z1 are used, at least one Zerevitinov-active compound Z1a being selected from the group consisting of alcohols, and at least one Zerevitinov-active compound Z1b being selected from the group consisting of amines.

In a further embodiment of the process according to the invention, at least one Zerevitinov-active compound Z2 is selected from the group consisting of alcohols and amines, preferably alcohols, and mixtures thereof.

The at least one Zerevitinov-active compound Z1 is preferably selected from the group consisting of alcohols, more preferably from the group of the polyols, especially glycerol, ethylene glycol, diethylene glycol, propylene glycol, dipropylene glycol, pentaerythritol, sorbitol, sucrose, $C_1$- to $C_{18}$-diols, castor oil, epoxidized and ring-opened fatty acids and esters thereof, trimethylolpropane, pentaerythritol, sugar compounds, for example glucose, sorbitol, mannitol and sucrose, polyhydric phenols, resols, for example oligomeric condensation products formed from phenol and formaldehyde and Mannich condensates formed from phenols, formaldehyde, dialkanolamines, and mixtures of at least two of the compounds listed.

Likewise preferably, at least one Zerevitinov-active compound Z1 is selected from the group consisting of amines, especially primary and secondary aliphatic and aromatic amines or mixtures thereof, most preferably selected from the group comprising hexamethylenediamine, ethylenediamine, propylenediamine, ethanolamine, orthocyclohexanediamine, aminocyclohexanealkylamine, and aromatic amines selected from the group comprising toluenediamine (TDA), especially 2,3 and 3,4 isomers of TDA, and diphenylmethanediamine (MDA) and polymeric MDA (p-MDA), melamine, and mixtures thereof.

The Zerevitinov-active compound Z1 may also comprise a plurality of amino groups and/or other Zerevitinov-active groups, for example OH groups.

In one embodiment the process according to the invention, the compound Z1 is the same as the compound Z2.

In another embodiment the process according to the invention, the compound Z1 does not correspond to the compound Z2.

In a preferred embodiment of the process according to the invention, no base with a $pK_b$ ($H_2O$) less than 1 is used in step (i).

The at least one monomer M suitable for ring-opening polymerization may be selected from the group comprising alkylene oxides, cyclic lactones, lactides, cyclic siloxanes, and mixtures thereof, preferably mixtures comprising alkylene oxides, more preferably alkylene oxides.

The alkylene oxides for the process according to the invention are preferably selected from the group comprising:

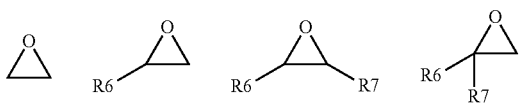

where: R6 and R7 are each selected from the group comprising alkyl, aryl, alkenyl. Alkyl here is preferably a radical selected from the group of the C1- to C10-alkyl compounds, preferably C1 to C2 compounds, more preferably C1 compounds.

Aryl is preferably a phenyl radical.

Alkenyl is preferably a radical selected from the group of C2- to C10-alkenyl compounds, preferably a C3-alkenyl compound.

In a preferred embodiment of the invention, the alkylene oxide is selected from the group comprising ethylene oxide (EO), propylene oxide (PO) and butylene oxide. In a particularly preferred embodiment of the invention, mixtures comprising propylene oxide are used.

In one embodiment of the process according to the invention, the monomers M or content thereof are varied during the reaction. Therefore, the process according to the invention also allows an ethylene oxide (EO) end cap.

Copolymerization, for example with lactones, lactide and/or cyclic siloxanes, is also possible by the process according to the invention.

Examples of suitable lactones for the copolymerization with alkylene oxides are substituted or unsubstituted lactones with 4-membered or larger rings, for example β-propiolactone, δ-valerolactone, ε-caprolactone, methyl-ε-caprolactone, β,β-dimethyl-β-propiolactone, β-methyl-β-propiolactone, α-methyl-β-propiolactone, α,α-bis(chloromethyl)propiolactone, methoxy-ε-caprolactone, ethoxy-ε-caprolactone, cyclohexyl-ε-caprolactone, phenyl-ε-caprolactone, benzyl-ε-caprolactone, ζ-enantholactone, η-caprylolactone, α,β,γ-trimethoxy-δvalerolactone, or β-butyrolactone, and mixtures thereof. In one embodiment, ε-caprolactone is used.

The temperature in step (i) of the process according to the invention is preferably in the range from 140° C. to 250° C., more preferably 140° C. to 180° C., most preferably 150° C. to 170° C.

In this case, step (i) generally takes at least 30 seconds, preferably 5 to 30 minutes, more preferably 10 to 25 minutes.

In one embodiment of the process according to the invention, a vacuum is applied in step (i).

In one embodiment of the process according to the invention, step (i) is performed in an apparatus selected from the group consisting of stirred tank reactor, tubular reactor, thin-film evaporator (also called falling-film evaporator), stripping column, flasher. By virtue of these apparatuses, the duration of step (i) can be reduced down to a few seconds.

In a preferred embodiment of the process according to the invention, the at least one monomer M suitable for ring-opening polymerization is selected from the group comprising alkylene oxides and mixtures thereof, the temperature during the reaction with the at least one monomer M in step (ii), after the end of step (i), being in the range from 90° C. to 140° C., preferably in the range from 100° C. to 130° C.

In a further preferred embodiment of the process according to the invention, the monomer M is selected from the group consisting of ethylene oxide, propylene oxide, butylene oxide and mixtures thereof, preferably mixtures comprising propylene oxide, and the Zerevitinov-active compound Z1 is selected from the group of the alcohols and mixtures thereof, preferably from the group comprising polyols, especially glycerol, ethylene glycol, diethylene glycol, propylene glycol, dipropylene glycol, pentaerythritol, sorbitol, sucrose, $C_1$- to $C_{18}$-diols, castor oil, epoxidized and ring-opened fatty acids and esters thereof, trimethylolpropane, pentaerythritol, sugar compounds, for example glucose, sorbitol, mannitol and sucrose, polyhydric phenols, resols, for example oligomeric condensation products formed from phenol and formaldehyde and Mannich condensates formed from phenols, formaldehyde, dialkanolamines, or melamine, and mixtures of at least two of the compounds listed, and the Zerevitinov-active compound Z2 is selected from the group of the alcohols and mixtures thereof, preferably from the group comprising polyols, especially glycerol, ethylene glycol, diethylene glycol, propylene glycol, dipropylene glycol, pentaerythritol, sorbitol, sucrose, $C_1$- to $C_{18}$-diols, castor oil, epoxidized and ring-opened fatty acids and esters thereof, trimethylolpropane, pentaerythritol, sugar compounds, for example glucose, sorbitol, mannitol and sucrose, polyhydric phenols, resols, for example oligomeric condensation products formed from phenol and formaldehyde and Mannich condensates formed from phenols, formaldehyde, dialkanolamines, or melamine, and mixtures of at least two of the compounds listed, and the temperature in step (i) is in the range from 140° C. to 180° C. for a duration of 5 to 30 minutes, and the temperature in step (ii), after the end of step (i), is in the range from 90° C. to 140° C., preferably in the range from 100° C. to 130° C.

The present invention further provides a polymerization product producible by the process according to the invention, and for the use of the polymerization product producible by the process according to the invention for preparation of polyurethanes.

BRIEF DESCRIPTION OF THE DRAWINGS

FIGURE is a schematic diagram of the course of the experiment showing the metering profiles and the resulting pressure plots.

EXAMPLES

To illustrate some aspects of the present invention, some examples are given hereinafter. These are in no way intended to restrict the scope of the invention.

In the experiments, the starters (alcohols) and the catalyst were first initially charged in an autoclave, which was filled with nitrogen for inertization, then heated to 110-130° C. and degassed under reduced pressure for several hours. In the experiments with a thermal activation stage (i), the vessel was then heated to 160° C. for 20 minutes. After cooling to the desired reaction temperature, in both cases, the propylene oxide was then metered in continuously while stirring (stirrer speed 600 l/min) in step (ii). On completion of metered addition and reaction of the monomer, the vessel was then evacuated under reduced pressure for 30 minutes and then cooled to 25° C.

The schematic diagram of the course of the experiment shows the metering profiles (see legend: "PO metering . . . ") and the resulting pressure plots. Through the pressure plot, a statement is possible about the reactivity of the catalyst: At high reactivity, the propylene oxide was converted rapidly and no high pressure built up in the vessel. At lower reactivity, the propylene oxide accumulated and higher pressures were observed. On attainment of an upper pressure limit resulting from the design of the autoclave, it was necessary in some cases to deviate from a constant metering rate and to throttle or even to stop the metered addition (thinner broken lines in the schematic diagram), which led to an extension of the metering time and hence a reduction in the metering rate. In order to be able to quantify the pressure plot and compare the reactivity, the maximum pressures attained in the vessel, and also metering times and resulting mean metering rates, are reported hereinafter.

Numerous examples are given hereinafter, in which products with OH numbers greater than 150 were synthesized. This is because of the relatively simple performance of screening experiments; it was, however, ensured that the candidates found to be highly reactive in this screening are very suitable for accessing the abovementioned high molecular weight products with OH numbers less than 150 (see also Ex. 3).

Example 1

A 300 ml vessel was initially charged with 20.0 g of glycerol, 7.69 g of diethylene glycol and 0.47 g of 1-ethyl-3-methylimidazolium acetate. After the inertization, 149.63 g of propylene oxide were metered in at a reaction temperature of 115° C. Since the upper pressure limit of 9.89 bar had been attained, the metered addition had to be throttled. After a reaction time of more than 8 hours, 154.8 g of product were obtained.

OHN 266 mg KOH/g
Polydispersity (GPC): 1.114
Viscosity: 172 mPas
$p_{max,1}$=8.15 bar
$p_{max}$=9.89 bar
Metering time: 420 minutes
Metering rate: 0.36 g/min

Example 2a

A 300 ml vessel was initially charged with 20.0 g of glycerol, 7.69 g of diethylene glycol and 0.44 g of 1-ethyl-3-methylimidazolium acetate. After the inertization and an activation at 160° C., the vessel was cooled to a reaction temperature of 115° C. and then 149.63 g of propylene oxide were metered in. After a reaction time of 5 hours, 164.8 g of product were obtained.

OHN 261 mg KOH/g
Polydispersity (GPC): 1.105
Viscosity: 176 mPas
$p_{max,1}$=3.57 bar
$p_{max,2}$=3.49 bar
Metering time: 225 minutes
Metering rate: 0.66 g/min

Examples 2b-e

Under analogous conditions to those described in example 2a, it was also possible to obtain a similar product with other catalysts. These catalysts differ in example 2b-e) only with regard to the 1,3-alkyl substitution (R1 and R2 in formula (I)) from the catalyst from example 2a. The respective substituents and the corresponding results are compiled in the table below. In examples 2f-g), the catalysts differ from the catalyst from example 2a in that the heteroatom at ring position 1 is not nitrogen but oxygen (2o or sulfur (2 g) and therefore also does not bear any alkyl substituent R2.

| * | #2b | #2c | #2d | #2e | #2f (O) | #2g (S) |
|---|---|---|---|---|---|---|
| R1 | methyl | ethyl | n-propyl | isopropyl | ethyl | ethyl |
| R2 | methyl | ethyl | n-propyl | isopropyl | — | — |
| m(cat.) | 0.37 g | 0.44 g | 0.50 g | 0.50 g | 0.38 g | 0.42 g |
| Activ. | yes | yes | yes | yes | yes | yes |
| Product | 165.5 g | 162.5 g | 166.3 g | 168.9 g | 148.5 g | 142.8 g |
| OHN | 264 | 258 | 263 | 259 | 281 | 284 |
| PDI | 1.1004 | 1.106 | 1.103 | 1.102 | 1.122 | 1.127 |
| Visco | 178 | 148 | 169 | 145 | 245 | 251 |
| $P_{max,1}$ | 4.3 | 3.5 | 3.9 | 4.0 | 5.6 | 6.2 |
| $P_{max,2}$ | 3.8 | 3.4 | 3.5 | 3.3 | 4.8 | 5.7 |
| Time | 230 | 230 | 230 | 230 | 230 | 230 |
| Rate | 0.65 | 0.65 | 0.65 | 0.65 | 0.65 | 0.65 |

*Explanations: m(cat.) = mass of the catalyst, Activ. = activation at 160° C. for 20 minutes, OHN in mg KOH/g, PDI = polydispersity (GPC), Visco = viscosity in mPas, $p_{max, 1\ and\ 2}$ in bar, Time = metering time in minutes, Rate = metering rate in g/min The analysis of the products obtained by this method has, as main products, the expected propoxylates based on glycerol and diethylene glycol. Characteristic by-products which are likewise found are the propoxylates of the ions from the catalyst, along with transesterification products.

An example here of the transesterified propoxylates of the acetate is the detection in the sample resulting from synthesis 2c by means of NMR spectroscopy:

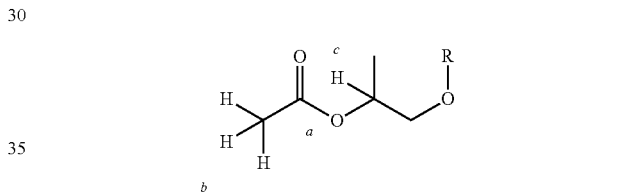

$^{13}$C NMR (CDCl$_3$): a 170 ppm
$^1$H NMR(CDCl$_3$): b 2.0 ppm, c 5.0 ppm

HMBC: Coupling detected between a and c and between a and b.

Since these signals do not overlap with signals of the main product in the case of the starter as used, the assignment to this structural element is unambiguous.

An example here of the propoxylates of imidazolium is the detection in the sample resulting from synthesis 2c by means of HPLC/MS coupling:

[M]$^+$ a series at 241, 299, 357, 415, 473 amu

These masses indicate propoxylates (starting at n=2) of the 1,3-diethylimidazolium cation.

Example 3

A 5 l vessel was initially charged with 200.0 g of glycerol and 30.0 g of 1-ethyl-3-methylimidazolium acetate (0.176 mol). On completion of inertization, the vessel was heated to 160° C. for 20 minutes and then cooled to the reaction temperature of 120° C. At this temperature, 4488 g of propylene oxide were metered in, in the course of which slight throttling of the metered addition was necessary on attainment of the upper pressure limit of 7.69 bar. After a reaction time of 5 hours, 3678 g of product were obtained.

OHN 96 mg KOH/g
Polydispersity (GPC): 1.126
Viscosity: 268 mPas
$p_{max,1}$=4.81 bar
$p_{max}$=7.69 bar
Metering time: 283 minutes
Metering rate: 15.86 g/min The analysis of the products obtained by this method has, as main products, the expected propoxylate based on glycerol. Characteristic by-products which are likewise found are the propoxylates of the ions from the catalyst.

An example here of the propoxylates of imidazolium is the detection by means of GPC/MS coupling:

$[M]^+$ corresponding to the formula $C_6H_{11}N_2+(C_3H_6O)_n$ a series comprising the signals 285, 343, 401, 459 amu.

These masses indicate propoxylates (starting at n=3) of 1-ethyl-3-methylimidazolium cation. They were found in the GPC analysis at surprisingly high retention times for these masses (probably owing to the permanent charge).

Example 4

A 5 l vessel was initially charged with 200.0 g of glycerol and 14.47 g of N-methylimidazole (0.176 mol). After the inertization, propylene oxide was metered in at 120° C. (planned: 4485.5 g). On attainment of the upper pressure limit of 7.60 bar, the metered addition was throttled to a gradually increasing degree. Thus, 4089 g of PO were metered in within the first 7 hours and 40 minutes of the metering time. During the following 13 hours, it was possible only to attempt metered addition of further small amounts of propylene oxide at much lower metering rates (limited by the upper pressure limit), but it was possible to add only 337 g, as a result of which these last 13 hours served basically only for complete reaction. Finally, 3568 g of product were obtained.
OHN 112 mg KOH/g
Polydispersity (GPC): 1.133
Viscosity: 204 mPas
$p_{max,1=5.34}$ bar
$p_{max}$=7.60 bar
Primary metering time: 460 minutes (7 hours and 40 minutes)
To that point: 4089 g of PO
Metering rate: 8.89 g/min Overall:
Metering time: 1240 minutes (20 hours, 40 minutes)
Propylene oxide: 4426 g
Metering rate: 3.57 g/min Examples 5-12

A 300 ml vessel was initially charged with 20.0 g of glycerol, 7.69 g of diethylene glycol and the catalyst (cat.). After the inertization and optionally an activation at 160° C., 149.63 g of propylene oxide were metered in at a reaction temperature of 115° C. After a reaction time of 5 hours, the product was isolated. The table which follows summarizes the experimental conditions and results of these experiments.

| *        | #5 (B) | #6 (B) | #7 (P) | #8 (P) | #9 (O) | #10 (O) | #11 (F) | #12 (F) |
|----------|--------|--------|--------|--------|--------|---------|---------|---------|
| m(cat.)  | 0.97 g | 0.97 g | 0.84 g | 0.84 g | 1.05 g | 1.05 g  | 0.65 g  | 0.65 g  |
| Activ.   | no     | yes    | no     | yes    | no     | yes     | no      | yes     |
| Product  | 163.5 g| 163.9 g| 163.1 g| 166.4 g| 166.0 g| 165.4 g | 167.0 g | 167.0 g |
| OHN      | 257    | 259    | 264    | 254    | 263    | 265     | 276     | 277     |
| PDI      | 1.098  | 1.100  | 1.104  | 1.104  | 1.105  | 1.108   | 1.107   | 1.104   |
| Visco    | 157    | 147    | 149    | 154    | 152    | 157     | 164     | 165     |
| $P_{max,1}$ | 3.0 | 3.9    | 4.7    | 3.8    | 3.9    | 3.1     | 3.4     | 4.0     |
| $P_{max,2}$ | 3.3 | 3.2    | 3.9    | 3.3    | 3.3    | 3.0     | 2.9     | 3.3     |
| Time     | 240    | 240    | 240    | 240    | 240    | 240     | 240     | 240     |
| Rate     | 0.62   | 0.62   | 0.62   | 0.62   | 0.62   | 0.62    | 0.62    | 0.62    |

B = 1-ethyl-3-methylimidazolium benzoate
P = 1-ethyl-3-methylimidazolium pivalate
O = 1-ethyl-3-methylimidazolium octanoate
F = 1-ethyl-3-methylimidazolium formate
*Explanations: m(cat.) = mass of the catalyst, Activ. = activation at 160° C. for 20 minutes, OHN in mg KOH/g, PDI = polydispersity (GPC), Visco = viscosity in mPas, $p_{max, 1\ and\ 2}$ in bar, Time = metering time in minutes, Rate = metering rate in g/min Example 13

A 300 ml vessel was initially charged with 20.0 g of glycerol, 7.69 g of diethylene glycol and 0.68 g of 1-ethyl-3-methylimidazolium ethylsulfate. After the inertization, 149.63 g of propylene oxide was to be added at a reaction temperature of 115° C. In the course of this, the upper pressure limit of 9.79 bar was attained and therefore the metered addition was first slowed and then stopped entirely, since this pressure had not declined even after more than 12 hours, and so no further propylene oxide was converted. Only 38.1 g of product were obtained.
OHN>650 mg KOH/g
Polydispersity (GPC): not determined
Viscosity: not determined
$p_{max,1}$=9.79 bar
Metered addition stopped Example 14

A 300 ml vessel was initially charged with 20.0 g of glycerol, 7.69 g of diethylene glycol and 0.68 g of 1-ethyl-3-methylimidazolium ethylsulfate. After the inertization and an activation at 160° C., the vessel was cooled to a reaction temperature of 115° C. and then 149.63 g of propylene oxide were metered in. In the course of this, a relatively high pressure of up to 8.39 bar built up continuously, which had not declined even after 5 hours. After these 5 hours of potential reaction time, 33.8 g of product were obtained.
OHN>650 mg KOH/g
Polydispersity (GPC): not determined
Viscosity: not determined
$p_{max}$=8.39 bar
Metering time: 240 minutes
Metering rate: 0.62 g/min Example 15

A 300 ml vessel was initially charged with 20.0 g of glycerol, 7.69 g of diethylene glycol and 1.34 g of tetrabutylammonium acetate. After the inertization, 149.63 g of propylene oxide was to be added at a reaction temperature of 115° C. In the course of this, the upper pressure limit of 9.79 bar was attained and therefore the metered addition was first slowed and then stopped entirely, since this pressure had not declined even after more than 15 hours, and so no further propylene oxide was converted. Only 95.2 g of product were obtained.

OHN 392 mg KOH/g
Polydispersity (GPC): 1.094
Viscosity: 219 mPas
$p_{max,1}$=9.79 bar
Metered addition stopped Example 16

A 5 l vessel was initially charged with 3168 g of a glycerol-based polypropoxylate (OHN=62 mg KOH/g, polydispersity (GPC)=1.554) and 30 g of 1-ethyl-3-methyl-imidazolium acetate. After the inertization, nitrogen is injected up to a pressure of 3.5 bar and then 497 g of ethylene oxide are metered in at a reaction temperature of 120° C. After a reaction time of 2 hours, 3594 g of product were obtained.

OHN 51 mg KOH/g
Polydispersity (GPC): 1.554
Viscosity: 732 mPas
$p_{max}$=4.9 bar
$p_{max,2}$=5.3 bar
Metering time: 165 minutes
Metering rate: 3.01 g/min

The invention claimed is:

1. A process for organocatalytic ring-opening polymerization of at least one monomer M suitable for ring-opening polymerization selected from the group comprising alkylene oxides selected from the group consisting of ethylene oxide, propylene oxide and butylene oxide, and cyclic lactones, lactides, cyclic siloxanes, or of mixtures thereof, wherein, in a step (i), at least one N-heterocyclic compound of the formula (I)

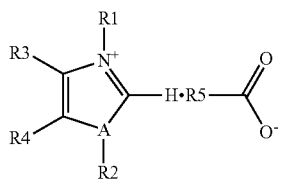

where A is selected from the group consisting of N, O and S, where no R2 radical is present when A is O or S and where R1 and R2 are each independently selected from alkyl and aryl, and where R3, R4 and R5 are each independently selected from H, alkyl, aryl, and where ring closures between R1 and R3, R3 and R4, and R4 and R2 are also possible, is subjected in the presence of at least one Zerevitinov-active compound Z1 to a temperature of at least 80° C., for a period of at least 30 seconds, and, in a step (ii), the monomer M is added and reacted.

2. The process for organocatalytic ring-opening polymerization according to claim 1, wherein R1 and R2 are each primary alkyl groups.

3. The process for organocatalytic ring-opening polymerization according to claim 1, wherein R1 is a primary and R2 a secondary alkyl group.

4. The process for organocatalytic ring-opening polymerization according to claim 1, wherein the anion in the formula (I) is selected from the group consisting of formate, acetate and propionate.

5. The process for organocatalytic ring-opening polymerization according to claim 1, wherein the anion in the formula (I) is selected from the group comprising benzoate, phthalate, terephthalate, isophthalate, succinate and glutarate.

6. The process for ring-opening polymerization according to claim 1, wherein step (ii) is not conducted until after the end of step (i).

7. The process for ring-opening polymerization according to claim 1, wherein step (ii) already commences during the duration of step (i).

8. The process for ring-opening polymerization according to claim 1, wherein at least one Zerevitinov-active compound Z1 is an alcohol.

9. The process for ring-opening polymerization according to claim 1, wherein at least one Zerevitinov-active compound Z1 is an amine.

10. The process for ring-opening polymerization according to claim 1, wherein at least two Zerevitinov-active compounds Z1 are used, at least one Zerevitinov-active compound Z1a is an alcohol, and at least one Zerevitinov-active compound Z1b is an amine.

11. The process for ring-opening polymerization according to claim 1, wherein the monomer M is added and reacted in the presence of at least one Zerevitinov-active compound Z2 that is selected from the group consisting of an alcohol and an amine.

12. The process for ring-opening polymerization according to claim 11, wherein the at least one Zerevitinov-active compound Z2 is the same as the at least one Zerevitinov-active compound Z1.

13. The process for ring-opening polymerization according to claim 1, wherein the at least one Zerevitinov-active compound Z2 is different from the at least one Zerevitinov-active compound Z1.

14. The process for ring-opening polymerization according to claim 1, wherein step (i) does not comprise a base with a $pK_b$ ($H_2O$) less than 1.

15. The process for ring-opening polymerization according to claim 1, wherein the at least one monomer M suitable for ring-opening polymerization is an alkylene oxide-selected from the group consisting of ethylene oxide, propylene oxide, and butylene oxide.

16. The process for ring-opening polymerization according to claim 15, wherein at least one alkylene oxide is propylene oxide.

17. The process for ring-opening polymerization according to claim 1, wherein at least two monomers M suitable for ring-opening polymerization are used, at least one of the monomers M is an alkaline oxide selected from the group consisting of ethylene oxide, propylene oxide, butylene oxide, and at least one of the second monomers M is a lactone.

18. The process for ring-opening polymerization according to claim 1, wherein the temperature in step (i) is from 140° C. to 250° C.

19. The process for ring-opening polymerization according to claim 1, wherein step (i) takes 5 to 30 minutes.

20. The process for ring-opening polymerization according to claim 1, wherein a vacuum is applied during step (i).

21. The process for ring-opening polymerization according to claim 1, wherein the at least one monomer M suitable for ring-opening polymerization is an alkaline oxide selected from the group consisting of ethylene oxide, propylene oxide, and butylene oxide, and the temperature during the reaction with the at least one monomer M in step (ii), after the end of step (i), is from 90° C. to 140° C.

22. The process for ring-opening polymerization according to claim 1, wherein the at least one monomer M is selected from the group consisting of ethylene oxide, propylene oxide, and butylene oxide, and the at least one Zerevitinov-active compound Z1 is an alcohol, a polyol, a sugar compound,
    wherein the at least one monomer M is added and reacted in the presence of at least one Zerevitinov-active compound Z2 that is an alcohol, a polyol, a sugar compound, a polyhydric phenol, and a resol,
    wherein the temperature in step (i) is from 140° C. to 180° C. for a duration of 5 to 30 minutes, and wherein the temperature in step (ii), after the end of step (i), is from 90° C. to 140° C.

\* \* \* \* \*